March 10, 1931.  C. A. SUNDBOM  1,795,352
FEED MECHANISM FOR BAKE OVENS
Filed Feb. 8, 1930  2 Sheets-Sheet 1

INVENTOR
CHESTER A. SUNDBOM
BY
ATTORNEY

March 10, 1931. C. A. SUNDBOM 1,795,352
FEED MECHANISM FOR BAKE OVENS
Filed Feb. 8, 1930 2 Sheets-Sheet 2
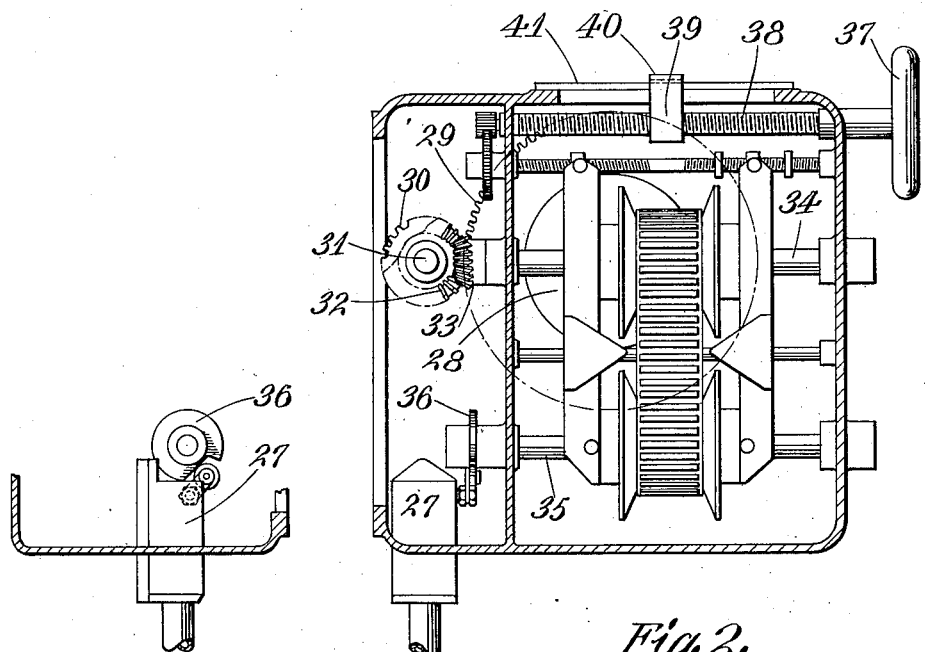
Fig. 2.
Fig. 2a.
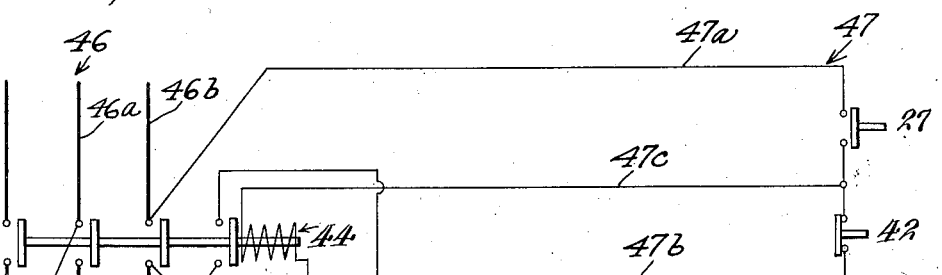
Fig. 3.
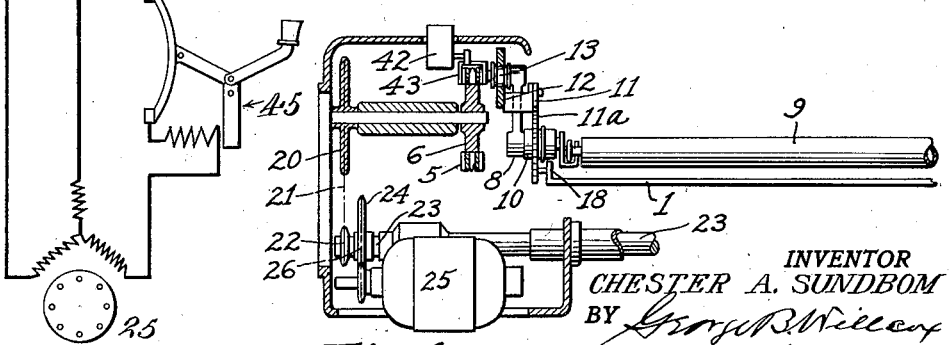
Fig. 4.
INVENTOR
CHESTER A. SUNDBOM
BY
ATTORNEY Patented Mar. 10, 1931

1,795,352

UNITED STATES PATENT OFFICE

CHESTER A. SUNDBOM, OF SAGINAW, MICHIGAN, ASSIGNOR TO BAKER PERKINS COMPANY, INC., OF SAGINAW, MICHIGAN, A CORPORATION OF NEW YORK

FEED MECHANISM FOR BAKE OVENS

Application filed February 8, 1930. Serial No. 426,966.

My invention relates to mechanism for loading articles to be baked into ovens of the traveling conveyor type.

It has for one of its objects to provide a pusher movable alternately to and away from the traveling conveyor of an oven for loading articles to be baked onto the conveyor and adapted to perform a working stroke each time the conveyor completes a predetermined unit length of travel. The invention includes means whereby a change in conveyor speed is automatically accompanied by a corresponding change in frequency of the working strokes of the pusher, so that the pusher will still perform one stroke for each unit length of conveyor travel, regardless of any adjustments that may be made by the operator in the conveyor speed.

For example, if the pusher is set to deliver rows of pans twelve inches long and spaced one inch between rows it is performing one stroke for each thirteen inches of conveyor travel. It is my object to provide for increasing this distance, say, to sixteen inches, when loading fifteen inch pans, or for decreasing it, say, to nine inches, when loading eight inch pans.

An object of my invention is also to provide in a compact pusher actuating mechanism an improved means whereby the pusher is caused to travel on its working stroke behind the pans and then travel its retractive stroke in a path elevated above the top level of the pans. This path of travel for the pusher permits of a group of pans being placed in position for the working stroke at any time during the preceding working stroke.

One portion of my invention comprises a novel means whereby the pusher bar is stopped approximately at the backward limit of its travel, and then started on a new working stroke by means of a starting device that is independent of the pusher mechanism. The starting means is actuated by the oven conveyor each time the conveyor completes a predetermined unit length of travel.

Another novel feature of this invention is a means included in the said starting means whereby the ratio between the rate of travel of the conveyor and the frequency of the working strokes of the pusher can be selectively varied. In other words the aforesaid unit length of conveyor travel can be changed.

Another feature of my invention resides in the provision of a pusher actuated so as to travel alternately to and away from the conveyor of an oven, and a track on which the pusher travels at all times, said track, or a portion thereof, being raised and lowered alternately by the pusher actuating mechanism so as to cause the pusher to travel its retractive stroke in a path elevated above the path of its working stroke.

Referring to the drawings, Fig. 1 is a side elevation of the pusher actuating mechanism as applied to an oven of the traveling plate type. It also shows diagrammatically the locations of the pusher stroke frequency controling switches as employed in this embodiment of my invention.

Fig. 2 is a side elevation showing the pusher starting switch actuating means and the frequency adjusting mechanism in its operative relationship with the oven conveyor shaft.

Fig. 2a shows the switch and switch tripping cam as viewed from the left in Fig. 2.

Fig. 3 is a diagram showing a system of wiring suitable for use in this invention.

Fig. 4 is a vertical transverse section, taken on line 4—4 of Fig. 1, showing the pusher mechanism at the left side of the oven conveyor and feed plate.

Figure 1:
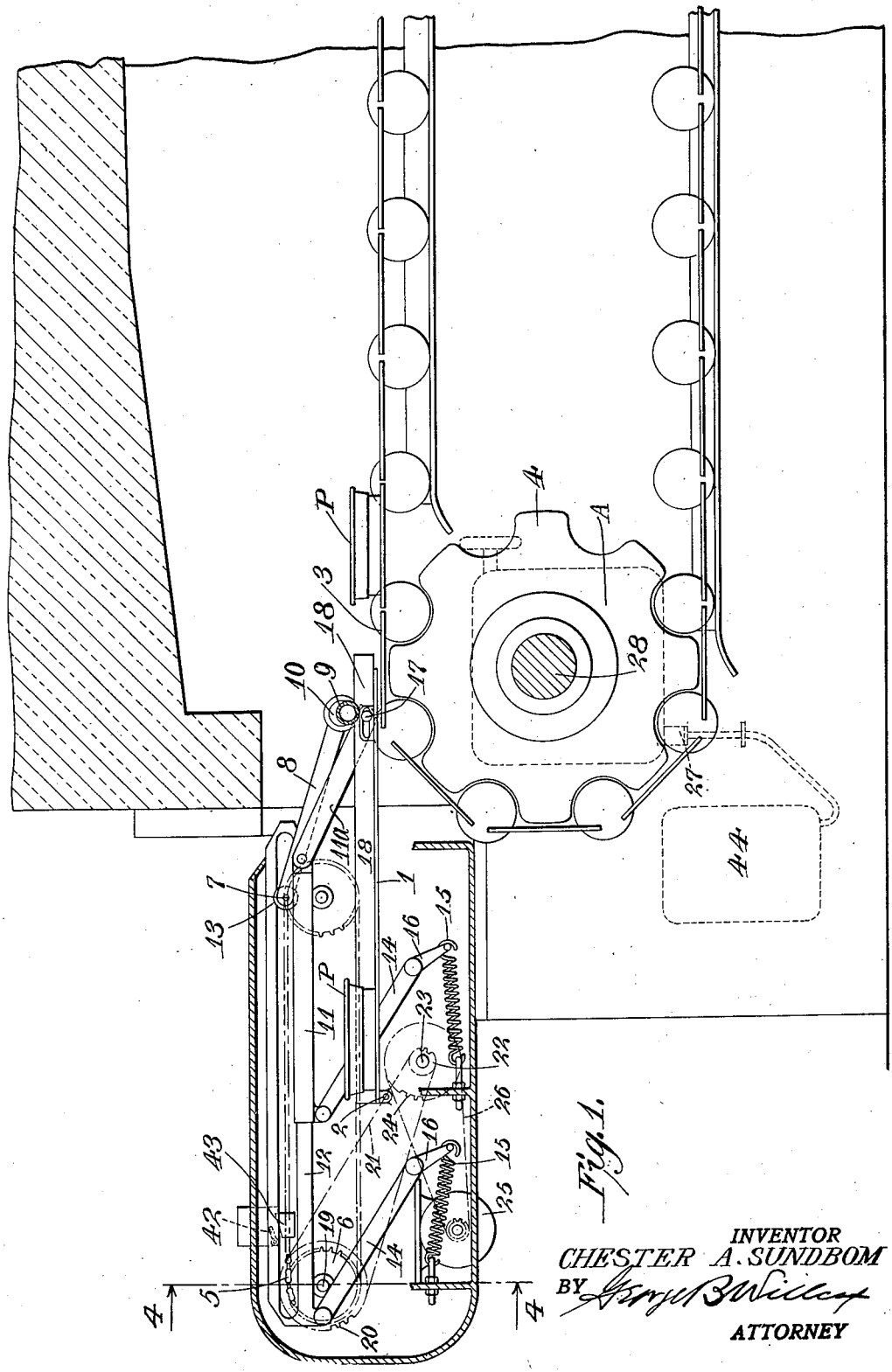

Referring to Figs. 1 and 3, a feed plate 1 extends the full width of the oven conveyor providing a delivery surface on which pans P are placed prior to being pushed into the oven and into place on the conveyor. This plate 1 is pivoted at its outer end 2 and rests on the plates 3 of the conveyor at its inner end so that it rises and falls with the edges of the plates as they round the conveyor sprockets 4. The pusher actuating mechanism, which is duplicated each side of the conveyor, comprises the following elements: On either side of the oven is a chain 5 passing over a pair of sprockets and driven through one of the sprockets 6 of each pair. A link of the chain carries a pin 7 to which is pivotally connected one end of an arm 8. At the other end of arm 8 pusher bar 9 is mounted, provided with a roller 10.

Rotation of sprocket in a direction counter clockwise in Fig. 1, imparts to the pusher a movement first away from the feed opening of the oven, and then toward it. Pin 7 follows the chain 5 around the sprockets, moving oven-ward close to the feed plate 1 and returning at the higher level of the upper run of the chain. Roller 10 travels on a track comprising sections 11 and 11a. Horizontal section 11 is rigidly attached to a longitudinally slotted bar 12. In the slot of bar 12 travels a roller 13 journaled on pin 7. Consequently the bar 12 and track section 11 are raised and lowered as pin 7 passes around the front and rear sprockets respectively. When pin 7 is traveling along a horizontal run of the chain the bar 12 is stationary, approximately level with the feed plate 1 when the pin moves ovenward on the lower chain run and is elevated above the feed plate when pin 7 moves away from the oven. The slotted bar 12 is maintained horizontal by parallel pivoted links 14 of equal length. Two counterbalancing springs 15 are fastened to arms 16 that extend past the pivot centers of links 14 and are anchored at their other ends to the machine frame.

Track section 11a is the portion of the track on which roller 10 travels at the end of its pushing stroke and at the beginning of its return stroke. It is pivoted at one end to track 11 and a pin 17 at its inner end is slidable in a slot formed in a rail 18 attached to the feed plate 1. When bar 12 and track section 11 are elevated section 11a forms an inclined track up which roller 10 carries the pusher bar on its return stroke so that bar 9 clears any pans P which may have been put in place on the feed plate 1 during the preceding working stroke. When the feed plate rises above the level of the track 11, as for example, when the edge of a conveyor plate passes under it and track 11 is in its lowered position, roller 10 travels on rail 18.

Shaft 19 on which the sprocket 6 is fixed also carries a shaft driving sprocket 20 which is connected by a chain 21 to a sprocket 22 on a shaft 23. Shaft 23 extends across the width of the oven and on its other end has another sprocket (not shown) driving the other pusher-bar actuating chain through a duplicate driving system. Shaft 23 also carries a sprocket 24 which is driven by a motor 25 through a chain 26.

The timing of the pusher bar reciprocations is preferably accomplished by starting and stopping driving motor 25.

Referring to Fig. 2 the starting of the motor is done through a starting and timing mechanism shown diagrammatically at A in Fig. 1 and located at one side of the oven, which closes a starting switch 27 a predetermined number of times for each revolution of the oven conveyor sprocket shaft 28.

As shown in Fig. 2 a gear 29 fixed on the oven sprocket shaft 28 meshes with a pinion 30 mounted on a shaft 31 which also carries a bevel gear 32. A bevel pinion 33 carried by the driven shaft 34 of a variable speed transmission of known type meshes with bevel gear 32. The driving shaft 35 of the variable speed transmission carries a cam 36 which trips the starting switch 27 once each revolution. Adjusting the speed ratio between the driving and driven shafts 35 and 34 of the transmission changes the number of closings of switch 27 per revolution of the oven shaft 28, and accordingly changes the distance traveled by the conveyor for each actuation of switch 27. For example the pitch circumference of the oven conveyor sprocket is, say, seventy-two inches. To place a row of pans every twelve inches on the conveyor the pusher bar must make six strokes for every revolution of the sprocket shaft 28.

Turning handwheel 37, which is fixed on a threaded shaft 38 of the variable speed transmission appropriately changes the speed ratio. A nut 39 carrying a pointer 40 travels on shaft 38. The pointer 40 moves over a scale plate 41 which is calibrated in terms of the inches of conveyor travel per pusher stroke, corresponding to any setting of the transmission ratio.

Since the frequency of operation of the pusher is determined by the distance traveled by the oven conveyor, a change of conveyor speed made by the operator in order to change the baking time correspondingly alters the number of pusher strokes per minute so that the pan spacing on the oven conveyor remains constant.

The stopping of the pusher in its withdrawn position is accomplished by the following mechanism: At the completion of each revolution of the pusher actuating chain 5 a limit switch 42 is tripped by a lug 43 that is carried by the chain 5, thus cutting off the current to the motor 25.

For purpose of illustration the lug 43 has been shown in Fig. 1 near limit switch 42 and pin 7 is shown in a forward position.

Fig. 3 is a wiring diagram showing one form of control circuit which may be used with my invention. Referring to this, figure 46 indicates the main power circuit, shown in heavy lines, supplying three-phase alternating current to the drive motor 25. Power circuit 46 is controlled by a switch 44. This switch is of the magnetic type, closed upon energizing of its solenoid, and self-opening when the solenoid-energizing current is interrupted. This switch has a set of contacts for each line of the power circuit and one for the control circuit 47. The control circuit 47, shown in light lines, comprises two legs 47a and 47b, both connected to a common leg 47c, which leads to one terminal of the solenoid of main switch 44. Single-phase alternating current for this circuit 47 is taken from two wires 46a and 46b, of the power circuit. The main switch is controlled by the normally open motor-starting switch 27, in leg 47a of the control circuit, and normally closed motor-stopping switch 42 in leg 47b.

The functions of these circuits can best be described in terms of their operation. Assume that main switch 44 is open, the drive motor 25 at rest. Switch 27 is momentarily closed, closing the circuit from wire 46b of the power circuit, through legs 47a and 47c of the control circuit, through the solenoid of switch 44, to wire 46a of the power circuit. This closes the main switch 44 and starts the drive motor 25. When the main switch is closed, current flows in the control circuit from wire 46b on the motor side of switch 44 through leg 47b, switch 42, leg 47c, and the switch solenoid to wire 46a. This current holds the switch 44 closed until the circuit is broken by the opening of switch 42. When this occurs, the switch 44 opens, the motor 25 stops, and the entire control circuit is dead until switch 27 is again closed.

At times, a row of pans while being moved by the pusher-bar may meet with an obstruction, such as an upwardly warped conveyor plate or a protruding rivet head. In such event the overload circuit breaker 45 cuts off the power and stops the motor, preventing damage to the pans or mechanism. The positive drive for both the working and return strokes of the pusher bar compels the pusher-bar to complete its full forward stroke before it can return to the starting point. After the obstructed pans have been freed manually or have been carried by the conveyor beyond the end of the pusher stroke the overload switch will remain closed, when reset manually or automatically. The pusher-bar will then complete its interrupted working stroke. This insures an unobstructed space on the conveyor for the next row of pans, making it impossibe for successive rows of pans to be forced against an obstructed set of pans.

My invention is not limited to the application shown, but it can be used to move goods from a moving pan conveyor extending across the feed end of the oven conveyor. I also contemplate its use with an oven having its main conveyor extending for a distance out of and in front of the baking chamber, in which case the exposed part of the conveyor itself would serve as a delivery surface. My mechanism would then serve to move the pans with their loaves rapidly into the steam in the first part of the baking chamber and to position them properly with respect to each other.

While my invention is shown applied to an oven of the traveling plate conveyor type, it is especially applicable to ovens of the traveling tray type, wherein individual trays are brought consecutively into register with a delivery surface at the loading station of the oven. In the application of my invention the pusher mechanism is timed to operate whenever a tray is in register with the delivery surface, pushing the articles to be baked from the delivery surface onto the tray.

In this case the variable speed mechanism can be omitted, and within the scope of the claims the switch-actuating mechanism can be driven from the sprocket shaft through constant ratio gearing, or the starting switch may be actuated by spaced lugs on the oven conveyor, without departing from the invention as set forth in the claims.

Having thus described my invention, what I claim and desire to secure by Letters Patent is:

1. In combination, an oven, a traveling conveyor, a reciprocable pusher, a drive mechanism therefor, a motor connected for actuating said mechanism, a motor circuit, a limit switch arranged for opening said motor circuit and positioned to be actuated by the pusher mechanism when the pusher is at approximately the backward limit of its travel, a motor-starting switch arranged for closing said motor circuit, starting switch actuating means associated with the conveyor mechanism and adapted to actuate said starting switch to close the motor circuit each time said oven conveyor completes a predetermined unit length of travel.

2. In combination, an oven, a traveling conveyor, a reciprocable pusher, a drive mechanism therefor, a motor connected for driving said mechanism, a motor circuit, a limit switch arranged for opening said motor circuit and positioned to be actuated by the pusher mechanism when the pusher is at approximately the backward limit of its travel, a motor starting switch arranged for closing said motor circuit, starting-switch actuating means associated with the traveling conveyor and positioned to actuate said starting switch at each completion, by the conveyor, of a predetermined unit length of travel, mechanism operatively connecting the conveyor with said starting-switch actuating means, for the purposes set forth.

3. In combination, an oven, a traveling conveyor including a shaft, a reciprocable pusher, a drive mechanism therefor, a motor connected for driving said mechanism, a motor circuit, a limit switch arranged for opening said motor circuit and positioned to be actuated by the pusher mechanism when the pusher is at approximately the backward limit of its travel, a motor starting switch arranged for closing said motor circuit, starting switch actuating means, driving gear operatively connecting said actuating means with said conveyor shaft, said gear adapted to vary the number of actuations of said starting switch per revolution of said conveyor shaft.

4. A structure as in claim 2 wherein the starting switch actuating means includes variable speed gearing adapted to permit changes, by adjustment, in said predetermined unit length of travel of the conveyor.

5. In combination with an oven having a traveling conveyor and a reciprocatory pusher bar, actuating mechanism for said bar, a motor connected for driving said mechanism, a motor circuit, a limit switch therein arranged to be actuated by said pusher mechanism to stop the motor when the pusher is approximately at the end of its retractive stroke, and means, actuated independently of the pusher mechanism for closing the motor circuit, for the purposes set forth.

6. A structure as set forth in claim 5 wherein the means for closing the motor circuit is operatively connected to and actuated by the conveyor.

7. In combination, an oven, a conveyor, a pusher, mechanism imparting back and forth movement to said pusher, means for stopping the movement of said pusher upon its arrival at approximately the rearward limit of its retractive stroke, means operated and controlled by the conveyor for starting the pusher on its return movement independently of the operation of said pusher stopping means.

8. In a conveyor-feeding apparatus, a movable pusher-bar, a pair of actuating mechanisms for said pusher-bar, one at each end thereof, comprising a pair of sprockets, an endless chain passing around said sprockets, an arm pivoted to the chain and connected at its free end to the pusher-bar, a track for said pusher-bar comprising a section movable in its vertical plane and maintained horizontal, a track section pivoted at one end to said horizontal section, its other end slidable in the plane of the conveyor, said horizontal track section carrying a longitudinally slotted bar, a pin carried by the chain and received in the slot for raising and lowering the horizontal track section.

9. In a conveyor-feeding apparatus, a reciprocatory pusher-bar, a pair of actuating mechanisms for said pusher-bar, one at each end thereof, comprising a pair of sprockets, an endless chain passing around said sprockets, an arm pivoted to the chain and connected at its free end to the pusher-bar, a track for said pusher-bar movable in its vertical plane and maintained horizontal, means for raising and lowering the same in time with the reciprocations of said pusher-bar.

In testimony whereof, I affix my signature.

CHESTER A. SUNDBOM.